(12) United States Patent
Purliyev

(10) Patent No.: US 10,582,785 B2
(45) Date of Patent: Mar. 10, 2020

(54) INFUSION PACKAGE MOVER

(71) Applicant: Marat Purliyev, Ashgabat (TM)

(72) Inventor: Marat Purliyev, Ashgabat (TM)

( * ) Notice: Subject to any disclaimer, the term of this patent is extended or adjusted under 35 U.S.C. 154(b) by 443 days.

(21) Appl. No.: 15/242,493

(22) Filed: Aug. 20, 2016

(65) Prior Publication Data
US 2018/0049581 A1    Feb. 22, 2018

(51) Int. Cl.
*A47G 19/16*  (2006.01)
*A47J 31/20*  (2006.01)

(52) U.S. Cl.
CPC .............. *A47G 19/16* (2013.01); *A47J 31/20* (2013.01)

(58) Field of Classification Search
CPC ........... A47J 31/20; A47J 31/44; A47G 19/16; A47G 19/22
USPC ......... 99/279, 283, 295, 317, 319, 321, 322; 426/77, 80, 82, 83, 86, 435
See application file for complete search history.

(56) References Cited

U.S. PATENT DOCUMENTS

| | | | |
|---|---|---|---|
| 2,737,373 A * | 3/1956 | Kinley | A47J 43/044 261/81 |
| 3,131,065 A | 4/1964 | Salomon | |
| 4,844,914 A | 7/1989 | Bonne et al. | |
| 5,047,252 A | 9/1991 | Liu et al. | |
| 2010/0031679 A1* | 2/2010 | Park | F25C 1/04 62/129 |
| 2015/0173554 A1* | 6/2015 | Talarico | A47J 31/20 426/435 |

FOREIGN PATENT DOCUMENTS

WO    2015082911 A1    6/2015

* cited by examiner

*Primary Examiner* — Phuong T Nguyen
(74) *Attorney, Agent, or Firm* — David Pressman, Esq.

(57) ABSTRACT

An infusion package mover comprises a housing comprising a hood (30) and a bottom (32) and a driving mechanism for moving a C-shaped rocker (34) back and forth. A flat spring (40) is attached to rocker (34) to form a slot for receiving and holding a string (44) attached to an infusion package (tea bag) (46) so that package (46) is suspended in an extracting liquid (52) in a cup (50). A push on a button (72) starts an electric circuit that causes the driving mechanism to move rocker (34) in the directions shown by the arrows so as to move package (46) back and forth in liquid (52), thus improving infusion. The movement continues until the electric circuit turns off the power. Other embodiments provide enhancements. After starting, the mover can be left unattended.

20 Claims, 7 Drawing Sheets

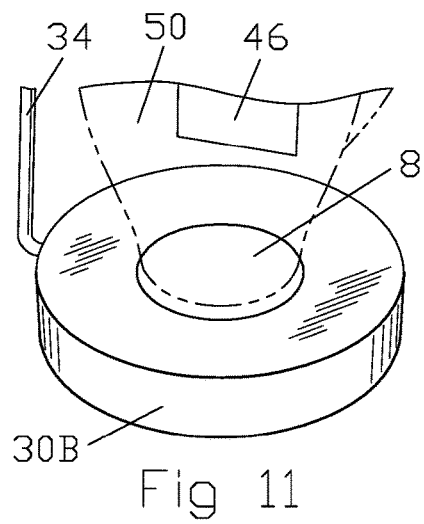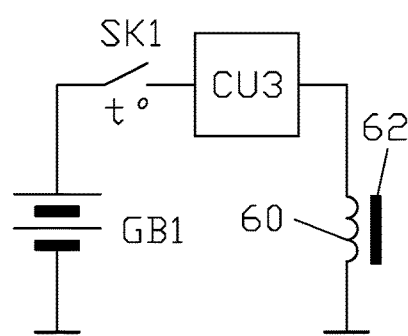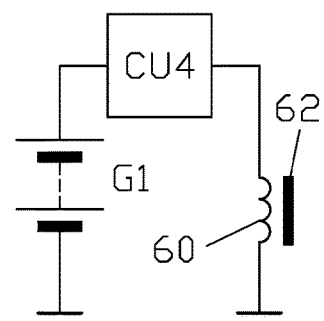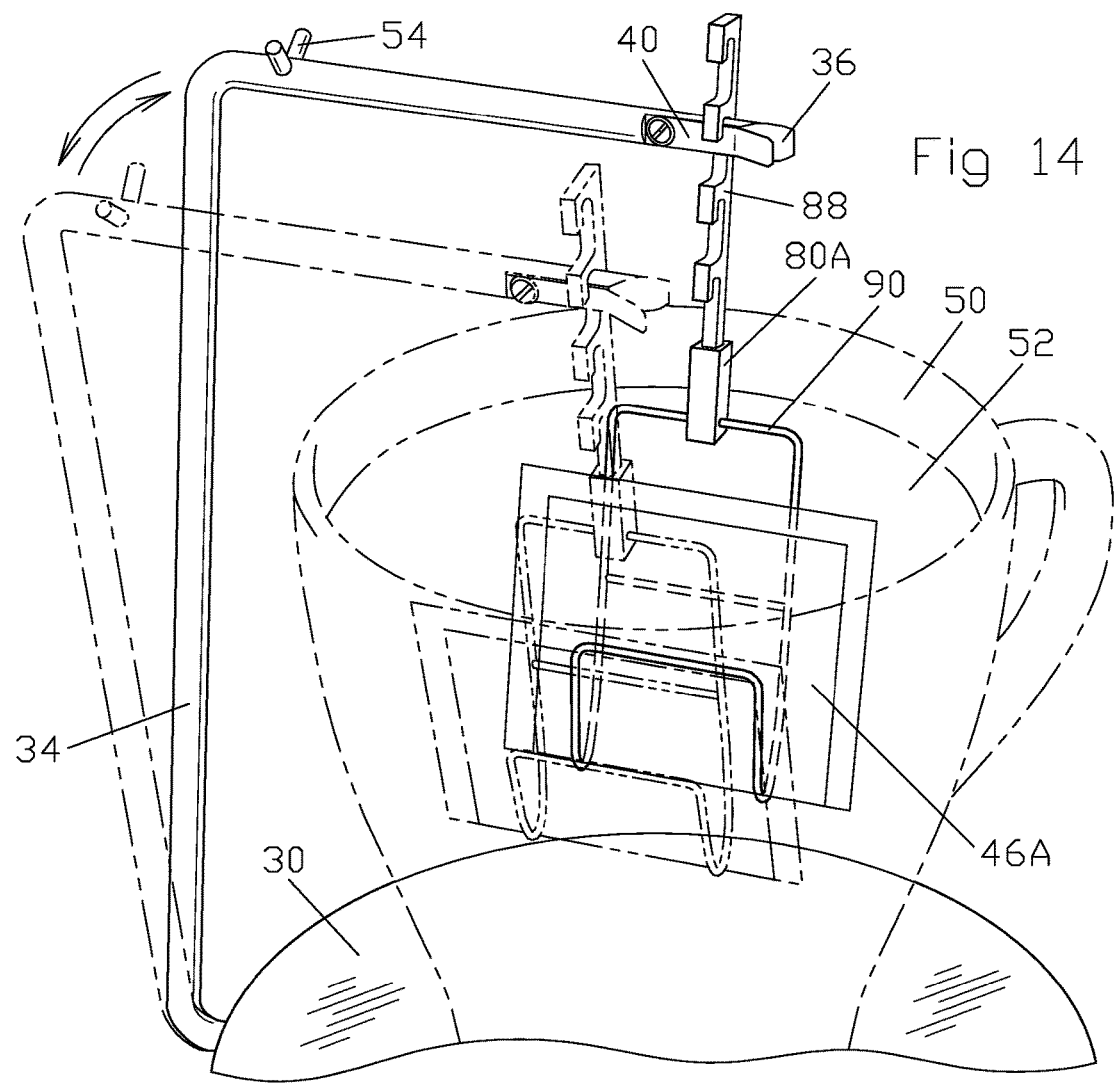

INFUSION PACKAGE MOVER

BACKGROUND—PRIOR ART

Various substances are packaged in a dissolvable or liquid permeable package so that the package can be immersed in a liquid to dissolve or infuse the contents of the package into the liquid. E.g., shredded tea leaves are commonly packaged in a mesh bag so that water can permeate the bag and elute the tea from the leaves. Some clothes washing detergents are packaged in a dissolvable package so that, when the package is placed in a washing machine, the package will dissolve and the detergent will dissolve in the washing water.

Experience shows that infusion of the contents of a package placed in an extracting liquid occurs more quickly and completely if the package does not lie at the bottom of the liquid container, but moves in the upper layers of the liquid. With tea bags, this can be attributed to the following: (1) the upper layers of water have higher temperatures than the layers near the bottom, (2) the part of the package, which usually contacts the bottom, now contacts only water and hence is fully involved in the infusion process, (3) water layers surrounding the package are more actively stirred. That is why most tea bag users commonly agitate the bags' strings during infusion.

Numerous attempts have been made to accelerate the rate of infusion. The following is a list of some patents in this area:

U.S. UTILITY PATENTS

| Pat. or Pub. No. | Issue or Pub. Date | Patentee or Applicant |
| --- | --- | --- |
| 3,131,065 | 1964 | Salomon |
| 4,844,914 | 1989 | Bonne et al. |
| 5,047,252 | 1991 | Liu et al. |

Salomon discloses a tea bag with a strip of metallic foil that allows a user to fix the bag on a spoon and thereby thoroughly stir it in water during infusion.

Bonne et al. describe an infusion bag having a rigid actuating handle connected to two subchambers to permit the subchambers to be subjected to up and down movements so that infusion of extractable substances can occur in a very short time.

Liu et al. disclose a beverage infusion device including porous pouches containing infusible material and secured to a rotatable, hand held shaft. In use, the shaft is rotated between the thumb and finger of a user so that a centrifugal flow pattern is created in water which enhances the efficiency of extraction of the infusible material.

Though all these devices increase the rate of infusion, they suffer from at least one disadvantage: they cannot be left unattended, i.e. their users must be present to operate them during the infusion process.

SUMMARY

To alleviate this problem, I provide an apparatus and method for improving infusion of the contents of packages intended for infusion, dissolution, or brewing of prepared raw materials contained in the packages. In one embodiment, an infusion package mover comprises a driving mechanism, a power source for the mechanism, and a rocker linked to the mechanism so that the mechanism can move the rocker in a predetermined range. An infusion package having suspension means can be suspended on the rocker so that the contents of the package is immersed into extracting liquid. Consequently, when the mechanism is in service, the rocker will move the package in the liquid in substantially horizontal directions, thereby improving infusion of the contents of the package.

The mover can also comprise a device for grasping and holding the suspension means of the package. The device is attached to the rocker so the rocker can swing the package. The mover can also comprise a removable adjustable device that can be installed on the rocker for holding an infusion package having no suspension means. The mover can further include an electric circuit for controlling the mechanism. The power source can provide electric or mechanical power. The electric power source can be a battery or a generator converting heat into electricity.

DRAWINGS—FIGURES

FIG. 11 is a perspective view of a thermo-switch and a thermoelectric embodiment.

FIG. 12 is a circuit diagram of the thermo-switch embodiment.

FIG. 13 is a circuit diagram of the thermoelectric embodiment.

FIG. 14 is a perspective view of a rocking cage embodiment of the mover.

REFERENCE NUMERALS

| | |
|---|---|
| 30-30B | hood |
| 32 | base |
| 34-34B | rocker |
| 36, 36A | inclined cutout |
| 38, 38A | longitudinal cutout |
| 40 | flat spring |
| 42-42B | screw |
| 44 | string |
| 46, 46A | infusion package |
| 48 | tag |
| 50 | cup |
| 52 | extracting liquid |
| 54 | horn |
| 56, 56A | yoke |
| 58 | torsion spring |
| 60, 60L, 60R | electromagnet |
| 62, 62L, 62R | core |
| 64 | collar bushing |
| 66-66F | projection |
| 68 | split pin |
| 70 | plate |
| 72-72B | control button |
| 74 | bracket |
| 76-76B | pin |
| 78 | saucer |
| 80, 80A | coupler |
| 82, 82A | shaft |
| 84 | mortise |
| 86 | round metallic plate |
| 88 | suspension bar |
| 90 | cage |
| 92 | groove |
| 94 | hook |
| 96 | first half |
| 98 | second half |
| 100, 100A | hole |
| 102 | hub |
| 104 | radial beam |
| 106 | ring |
| 108 | pivotable arm |
| 110, 110A | lug |
| 112 | teapot |
| 114 | flange |
| 116 | compression spring |
| 118 | washer |
| 120, 120A | tie plate |
| 122 | switch |
| 124 | nut |

DETAILED DESCRIPTION

Side Button Embodiment—FIGS. 1-4

Figure 1:
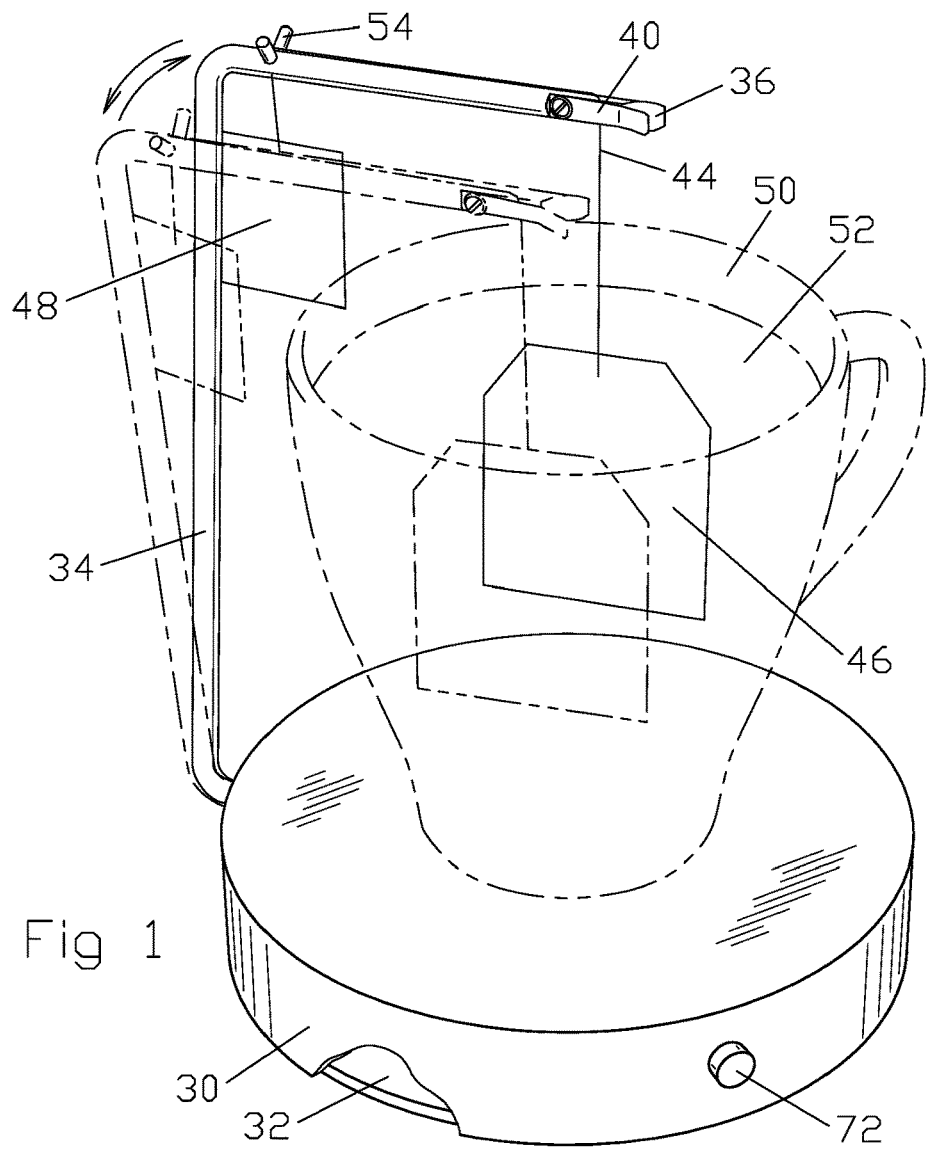
FIG. 1 is a perspective view of a side button embodiment of the infusion package mover.

FIG. 1 shows an infusion package mover comprising a cylindrical housing having a hood 30 and a base 32 joined by screws. The housing is essentially a shell made of a rigid material, such as polystyrene. The housing contains a driving mechanism and an electric circuit (described later). The mover also comprises a C-shaped rocker 34 made, for example, of a metal round bar. The lower horizontal leg of rocker 34 is attached to the driving mechanism.

Figure 2:
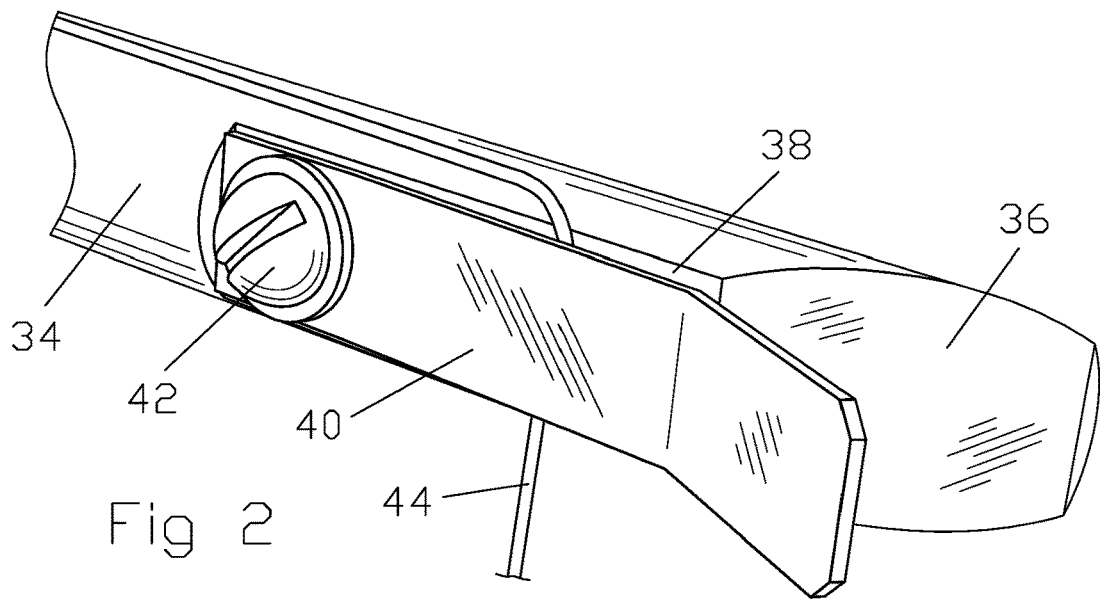
FIG. 2 is a close-up of the top of the side button embodiment's rocker.

FIG. 2 shows the end of the upper leg of rocker 34, which has an inclined cutout 36 and a longitudinal cutout 38. One end of a flat spring 40 is secured in cutout 38 by a screw 42. A slot formed by spring 40 with cutout 38 constitutes a package string holder or grasping device. When nothing is inserted in the string holder, spring 40 is pressed against substantially the entire surface of cutout 38. The free end of spring 40 is bent away from cutout 36 to form a lead-in; the lead-in makes it easy to insert a string 44 in the string holder. When a string is inserted into the lead-in between spring 40 and cutout 38, the spring and the cutout will grasp and hold the string firmly.

As shown in FIG. 1, the bottom end of string 44 is attached to an infusion package or tea bag 46 and the top end to a tag 48. Bag 46 is depicted in a simplified form so that its vertical dimension (height) and one of its horizontal dimensions (width) are shown and its thickness is not illustrated. A cup 50 filled with an extracting liquid 52 is positioned at the center of hood 30. String 44 is set in the string holder so that bag 46 hangs above the bottom of cup 50 and is immersed into liquid 52. Two metal horns or bosses 54 are fixed in two blind holes in the upper leg of rocker 34. String 44 extends over the top of rocker 34 to between horns 54 and hangs on one of them so that tag 48 is suspended away from cup 50 and cannot fall or move into liquid 52. The length of horns 54 and the angle between them are sufficient to prevent string 44 from sliding down of horn 54 during operation of the mover.

Figure 3:
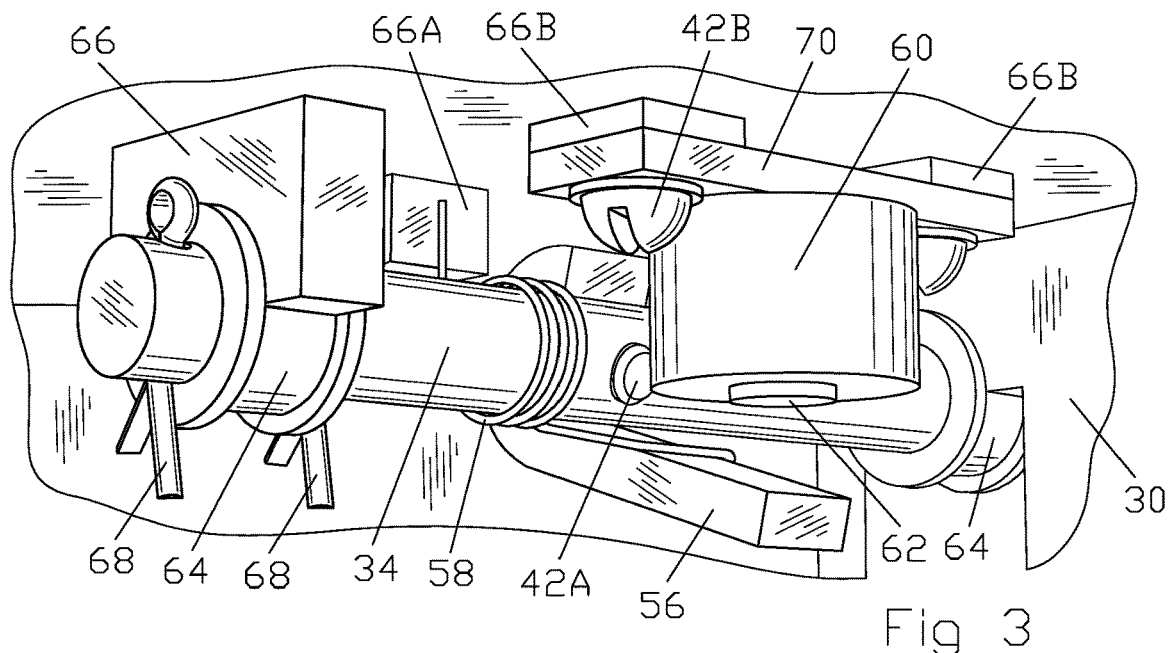
FIGS. 3 and 3A are perspective views of the side button embodiment's driving mechanism (rocker in initial extreme position).
Figure 3A:
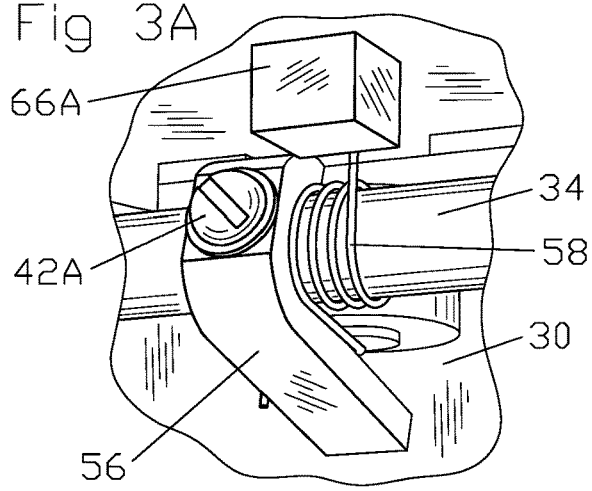

FIGS. 3 and 3A show the driving mechanism of the mover in a position defining the initial extreme incline of rocker 34 (base 32 is removed). The main parts of the mechanism are a yoke 56, a torsion spring 58, and an electromagnet 60 with a core 62. Yoke 56 is made of magnetically soft steel having low magnetic remanence. Yoke 56 partially embraces the lower leg of rocker 34 and is fixed on it by a screw 42A (FIG. 3A). The leg is located in two collar bushings 64. The contacting surfaces of rocker 34 and bushings 64 are lubricated. Bushings 64 are installed in adjacent semi-round openings made in the sidewall and a projection 66 of hood 30 and matching projections (not shown) of base 32. Two split pins 68 are installed in the holes in the lower leg of rocker 34 to prevent its axial shifting in bushings 64. Thus the only movement rocker 34 can make is to turn in bushings 64.

The lower leg of rocker 34 passes through the spiral of spring 58 with a predetermined clearance, which ensures free twisting of spring 58 around the leg. One end of spring 58 leans on a projection 66A of hood 30, and the other embraces yoke 56, thus preventing a shift of spring 58 along the lower leg of rocker 34. Spring 58 pushes yoke 56 away from core 62 so that yoke 56 in its initial position is pressed to a projection (not shown) of base 32, which establishes the initial extreme incline of rocker 34. Core 62 is fixed by a screw (not shown) on a plate 70 installed on two projections 66B of hood 30 with the help of two screws 42B.

Figure 4:
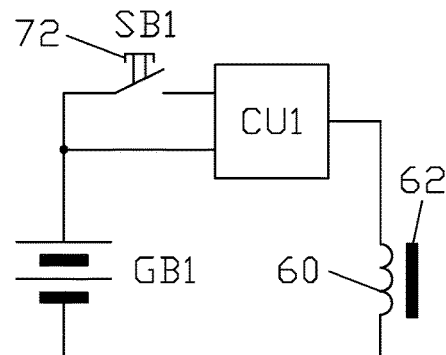
FIG. 4 is a circuit diagram of the side button embodiment.

FIG. 4 shows the circuit diagram of the mover. The circuit includes a battery GB1, a push-button switch SB1 with self-reset and a control button 72, a control unit CU1, and electromagnet 60 with core 62. Unit CU1 can be an all-inclusive integrated circuit or a combination of electronic control circuits and distinct electromechanical components, e.g., relays. Unit CU1 functions as a timer and an electronic switch that controls electromagnet 60. Initially unit CU1 is in a standby state. Button 72 projects outward through a hole in the sidewall of hood 30 (FIG. 1). The hole allows free inward and outward movement of the button when it is pressed or released by a finger.

Operation

Side Button Embodiment—FIGS. 1, 3, 4, 5

A brief finger push on button 72 (FIGS. 1, 4) closes the contacts of switch SB1 and thereby initiates unit CU1. Unit CU1 starts a countdown and a periodic connection and disconnection of electromagnet 60 to and from battery GB1.

Figure 5:
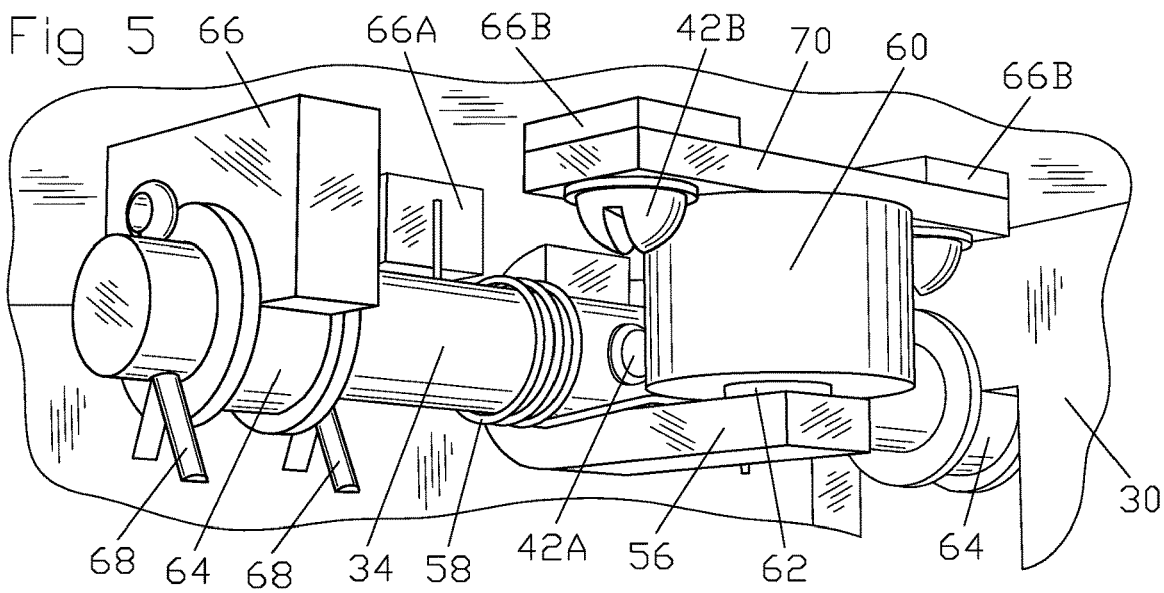
FIG. 5 is a perspective view of a driving mechanism (rocker in second extreme position).

The duration of each connection or disconnection operation is about 2 sec; thus one cycle takes about 4 sec, and there are about 15 cycles per minute. When electromagnet 60 is connected to battery GB1, its core 62 magnetizes and drags up yoke 56 (FIG. 3), overcoming the force of spring 58. Yoke 56 turns rocker 34 in bushings 64 until yoke 56 touches core 62 (FIG. 5). The touch defines the second extreme incline of rocker 34 (FIG. 1) depicted in dash-dot-dot-dash lines. Consequently, string 44 follows the string holder of rocker 34 and moves package 46 in liquid 52 to its second extreme position, also depicted in dash-dot-dot-dash lines.

When electromagnet 60 is disconnected from battery GB1 by unit CU1, its core 62 releases yoke 56. Spring 58 forces yoke 56 to turn rocker 34 to its initial extreme position (FIG. 1). Consequently, string 44 moves package 46 in liquid 52 to its initial extreme position. Thus, rocker 34 rocks cyclically in the directions shown by the arrows at the upper left in FIG. 1. As a result, package 46 continuously or cyclically moves substantially horizontally back and forth in liquid 52 from the position shown in solid lines to the second extreme position shown in phantom lines (dash-dot-dot-dash lines) and back about 15 times per minute, causing its contents to infuse quickly and fully. As shown, the second extreme position is spaced and separate from the initial position so that the mechanism continuously or cyclically transfers package 46 through the liquid from one place to a separate and horizontally spaced place and back for thorough infusion. As shown, the distance between the positions is about half the width of the package. There is some hysteresis or lagging of package 46 behind the upper leg of rocker 34 as package 46 moves back and forth in liquid 52.

When unit CU1 finishes its countdown, preferably set to about 4 minutes, it disconnects electromagnet 60 and stands by. (The duration of the countdown is sufficient for the infusion completion.) Thus the life of battery GB1 will be maximized. Rocker 34 returns to its initial position. The mover stands by.

Description

Dual Rocker Embodiment—FIGS. 6, 7, and 2-4

Figure 6:
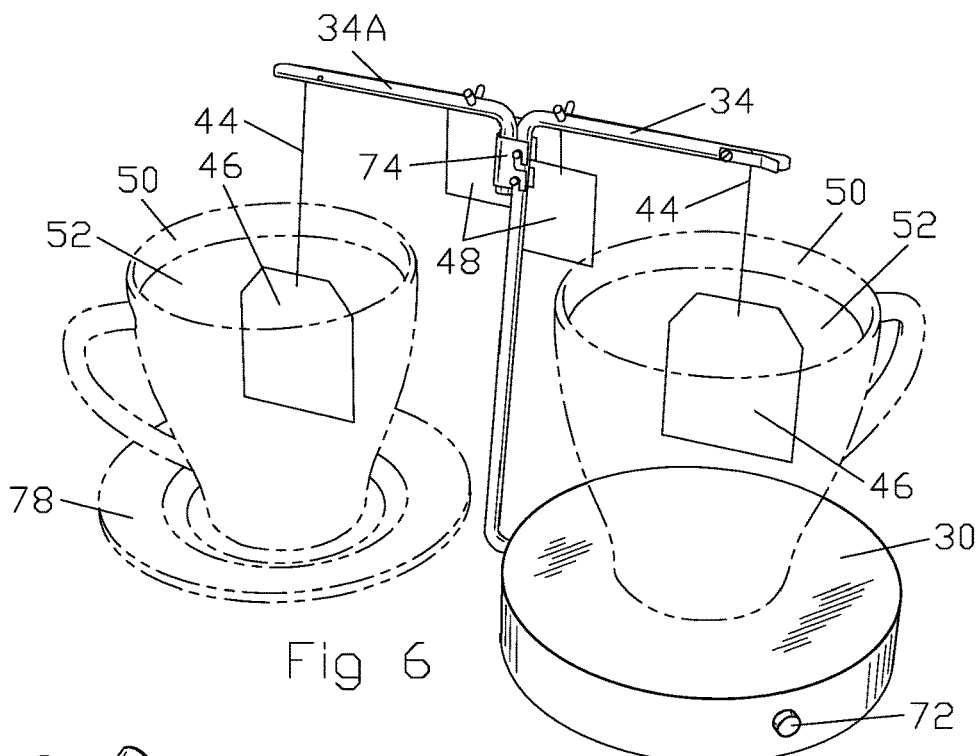
FIG. 6 is a perspective view of a dual rocker embodiment of the mover.
Figure 7:
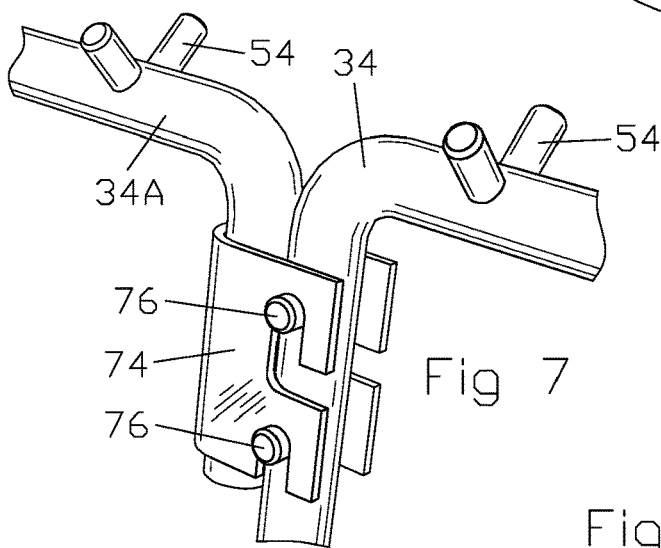
FIG. 7 is a close-up of the conjunction of two rockers.

FIG. 6 shows an alternative embodiment of the infusion package mover similar to the side button embodiment of FIGS. 1-5, except that this embodiment can infuse two bags 46 in two cups 50. This embodiment comprises additional mechanical parts: a rocker 34A, a U-type bracket 74, and two pins 76 (FIG. 7). All the rest is the same as in the side button embodiment. Rocker 34A replicates the upper part of rocker 34 with its string holder and horns 54. Bracket 74 embraces the vertical leg of rocker 34A and is fixed on it, for example, by contact welding. Pins 76 are fixed in the holes in the vertical leg of rocker 34 and project from its opposite sides. Two pairs of grooves in bracket 74 provide it with a removable though substantially motionless installation on pins 76. In FIG. 6, two cups 50 filled with liquid 52 are placed under the string holders of rockers 34 and 34A. One of the cups stands on a saucer 78. Correspondingly, two strings 44, attached to two infusion packages 46 and tags 48, are set in the string holders and between horns 54 in the same manner as in the side button embodiment of FIGS. 1-5.

Operation

Dual Rocker Embodiment—FIGS. 6, 3, 4, 5

Operation of this embodiment is actually the same as of the side button embodiment of FIGS. 1-5. By synchronous operating two rockers 34 and 34A, this embodiment will simultaneously infuse two packages or bags 46 in two cups 50. This embodiment is suitable for a couple who want to make two cups of tea simultaneously.

Description

Detachable Rocker Embodiment—FIGS. 8, and 2-4

Figure 8:
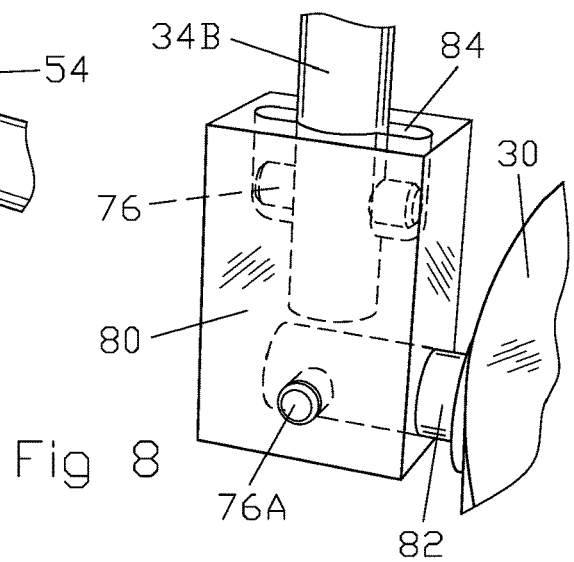
FIG. 8 is a close-up of a detachable rocker embodiment's rocker.

FIG. 8 shows the lower part of a detachable rocker embodiment of the infusion package mover; this embodiment is similar to the side button embodiment of FIGS. 1-5. The difference is that instead of rocker 34 this embodiment comprises a detachable L-shaped rocker 34B, a coupler 80 and a shaft 82. Rocker 34B fully replicates the upper and middle parts of rocker 34 of the side button embodiment. Shaft 82 is similar to the lower leg of rocker 34. Rocker 34B and shaft 82 are made of the same material as rocker 34. Shaft 82 is fixed in a blind hole of coupler 80 with a pin 76A. Pin 76 is fixed in a hole in rocker 34B. Rocker 34B is inserted in a blind hole in coupler 80 so that pin 76 is located in a mortise 84 made in coupler 80. The dimensions of mortise 84 ensure a minimal gap between pin 76 and the side surfaces of mortise 84. This provides a removable though substantially immobile installation of rocker 34B in coupler 80. Coupler 80 can be made of an aluminum alloy or rigid plastic. All other parts and materials are the same as in the side button embodiment.

Operation

Detachable Rocker Embodiment—FIGS. 8, 3, 4-6

Operation of this embodiment is identical to the one of the side button embodiment of FIGS. 1-5. Rocker 34B and shaft 82 work as rocker 34 and its lower horizontal leg, correspondingly.

As seen in FIG. 8, rocker 34B can be inserted in coupler 80 so that the upper leg of rocker 34B will point either towards or away from hood 30. This can be useful when a cup or teapot is too tall to be positioned on hood 30 under the string holder: the cup may be placed on the spot occupied by saucer 78 in FIG. 6. In addition, the embodiment can have spare rockers with different length of their vertical legs that can be used in such cases. The detachable rocker also provides ease of packing, transporting and storage of this embodiment.

Description

Central Button Embodiment—FIGS. 9, 10, 2, 3, 3A

Figure 9:
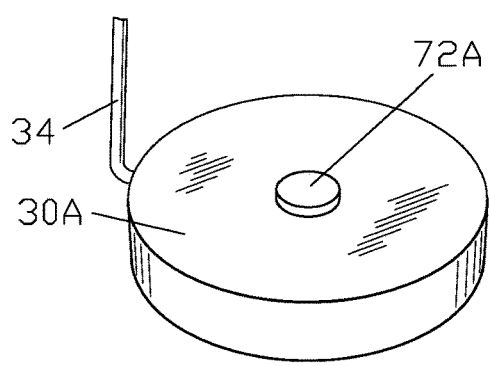
FIG. 9 is a perspective view of a central button embodiment of the mover.
Figure 10:
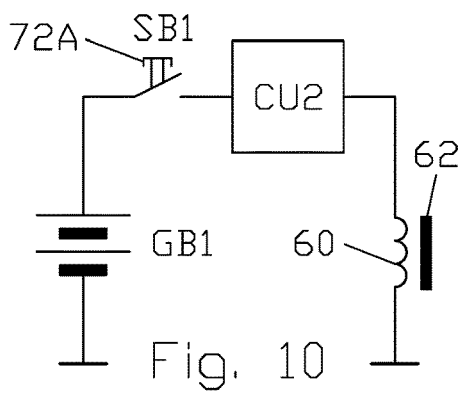
FIG. 10 is a circuit diagram of the central button embodiment.
Figure 15:
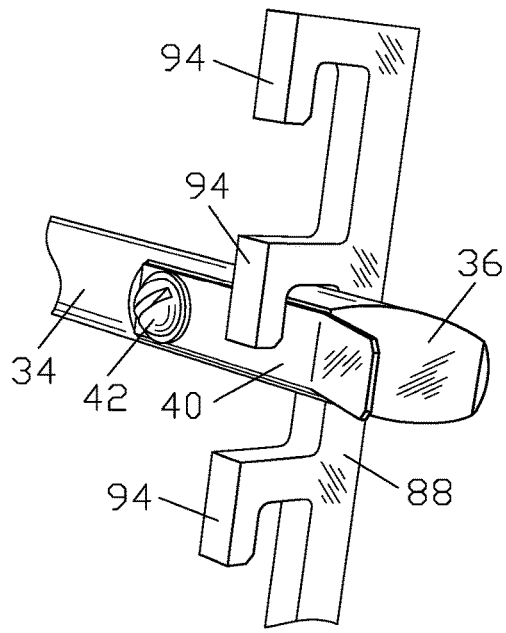
FIGS. 15 and 16 are close-ups of the top of the rocking cage embodiment's rocker.
Figure 16:
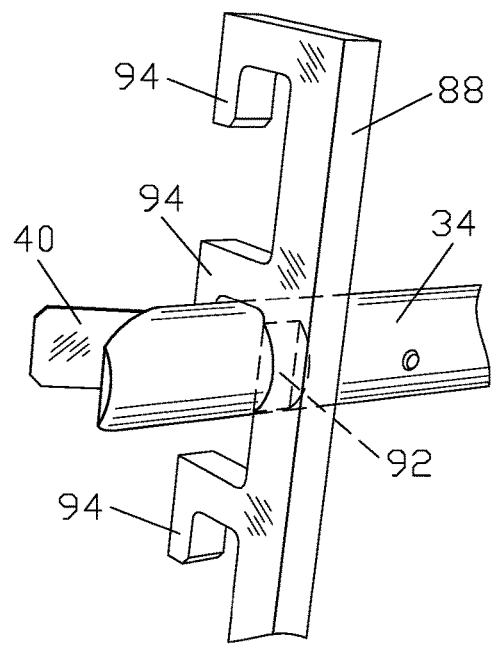

FIG. 9 shows the lower part of a central button embodiment of the infusion package mover; this embodiment is similar to the side button embodiment of FIGS. 1-5. The difference is that a control button 72A of the push-button switch projects through a hole in the center of the top wall of a hood 30A. All other mechanical parts and materials are the same as in the side button embodiment.

The circuit diagram of this embodiment (FIG. 10) is similar to that of FIG. 4. The difference is that a control unit CU2, in comparison with unit CU1, has no direct connection to battery GB1, and performs an additional function, namely a predetermined start delay when the voltage is applied to unit CU2. That is when energized by closure of SB1, unit CU2 will start performing the functions of a timer and an electronic switch after a delay of 10 seconds, for example.

Initially unit CU2 stands by. The components GB1, SB1, 60 and 62 are the same as in the side button embodiment.

Operation

Central Button Embodiment—FIGS. 9, 10, 3, 5

When cup 50 with extracting liquid 52 is placed upon button 72A, the latter moves down, closes the contacts of switch SB1 (FIG. 10), and thereby connects unit CU2 to battery GB1.

CU2 provides the delay of 10 seconds to enable a user to arrange bag 46, string 44, and tag 48, and then starts a countdown and effects a periodic connection and disconnection of electromagnet 60 to and from battery GB1. Further operation is identical to the one of the side button embodiment.

When unit CU2 finishes its countdown, it disconnects electromagnet 60. Rocker 34 returns to its initial position. When cup 50 is taken away, button 72A releases the contacts of switch SB1, and unit CU2 returns to its initial state. The mover stands by.

The central button embodiment starts its operation automatically, i.e. without a finger push of a switch button.

Description

Thermo-Switch Embodiment—FIGS. 11, 12, 2, 3, 3A

FIG. 11 shows the lower part of a thermo-switch embodiment of the infusion package mover similar to the side button embodiment of FIGS. 1-5. The difference is that the push-button switch is replaced by a thermo-switch (not shown), and a round metallic plate 86 is fixed in a hole in the center of the top wall of a hood 30B. Plate 86 is level with the top surface of hood 30B. The thermo-switch is installed underneath and has a sufficient thermal contact with plate 86. All other mechanical parts and materials are the same as in the side button embodiment.

FIG. 12 shows the circuit diagram of the embodiment. The components GB1, 60, and 62 are the same as in the side button embodiment. The contacts of thermo-switch SK1 close when plate 86 (FIG. 11) reaches a predetermined temperature, e.g., 80° C. SK1 opens again when the temperature of plate 86 falls below 70° C. Like unit CU1 of FIG. 4, control unit CU3 performs the functions of a timer and an electronic switch.

Operation

Thermo-Switch Embodiment—FIGS. 11, 12, 3, 5

When cup 50 with hot extracting liquid 52 is placed on plate 86, its temperature starts rising. Meanwhile a user inserts string 44 in the string holder and arranges package 46 and tag 48. In a few seconds, when the temperature of plate 86 rises over 80° C., the contacts of switch SK1 (FIG. 12) close and connect unit CU3 to battery GB1. Unit CU3 starts a countdown and a periodic connection and disconnection of electromagnet 60 to and from battery GB1. Further operation is identical to the one of the side button embodiment.

The operation goes until the temperature of plate 86 falls below 70° C. At that moment, the contacts of switch SK1 release and thereby disconnect unit CU3 and electromagnet 60 from battery GB1. Unit CU3 returns to its initial state. Rocker 34 returns to its initial position.

The thermo-switch embodiment starts its operation automatically and does not need a push-button switch.

Description

Thermoelectric Embodiment—FIGS. 11, 13, 2, 3, 3A

FIG. 11 also shows the lower part of a thermoelectric embodiment of the infusion package mover. All mechanical parts and materials of the embodiment are the same as in the thermo-switch embodiment, but the electric circuit differs.

FIG. 13 shows the circuit diagram of the embodiment. Electromagnet 60 with core 62 is the same as in the thermo-switch embodiment, but thermo-switch SK1 and battery GB1 are replaced by a flat thermoelectric module G1. Module G1 is in fact a plurality of electrically connected thermoelectric elements. Operation of module G1 is based on thermoelectric generation due to the Seebeck effect, where two different conductors at different temperatures produce a voltage across them. Module G1 thus serves as a power source for the electric circuit and it is installed underneath and has a sufficient thermal contact with plate 86. A control unit CU4 performs function of an electronic switch.

Operation

Thermoelectric Embodiment—FIGS. 11, 13, 3, 5

When cup 50 with hot extracting liquid 52 is placed on plate 86, its temperature starts rising. Meanwhile a user inserts string 44 in the string holder and arranges package 46 and tag 48. In a few seconds, the temperature of plate 86 rises so that the output of module G1 becomes sufficient to initiate unit CU4. Unit CU4 starts a periodic connection and disconnection of electromagnet 60 to and from module G1. Further operation is identical to the one of the side button embodiment. The operation goes as long as the temperature of plate 86 is high enough for module G1 to provide sufficient power for unit CU4 and electromagnet 60.

The thermoelectric embodiment starts its operation automatically and does not need a battery.

Description

Rocking Cage Embodiment—FIGS. 14-16, and 2-4

FIG. 14 shows a rocking cage embodiment of the infusion package mover similar to the side button embodiment of FIGS. 1-5. The difference is that this embodiment comprises additional mechanical elements: a suspension bar 88, a coupler 80A, a cage 90, and a groove 92 (FIG. 16) made in the upper leg of rocker 34. Bar 88 is made of an aluminum alloy such as duralumin or a like material. Coupler 80A is molded of polystyrene or made of other durable material having low thermal conductivity and able to withstand the temperature of extracting liquid 52. Cage 90 is made of stainless steel or other durable and food-compatible material. Bar 88 has an array of identical hooks 94 (FIGS. 15, 16) providing a removable but substantially immobile fixation of bar 88 in groove 92. Bar 88 and cage 90 (FIG. 14) are fixed in coupler 80A with a predetermined gap between them to minimize heat leakage from liquid 52 via bar 88. An infusion package 46A, which has no means for its agitating, freely rests in cage 90. Bar 88 is mounted on rocker 34 so that the contents of package 46A is immersed into liquid 52.

Operation

Rocking Cage Embodiment—FIGS. 14-16, 3, 4, 5

Operation of this embodiment is essentially the same as of the side button embodiment of FIGS. 1-5. The difference is that this embodiment rocks package 46A by means of cage 90 instead of pulling a string of a package. During the rocking, package 46A can also tilt around its lower facet due to inertia and streams in liquid 52. This additionally improves infusion. The rocking cage embodiment improves infusion of the packages having no means for their agitating regardless of their shape, i.e. round, square, rectangle, triangle, etc.

Description

Pyramidal Embodiment—FIGS. 17-22

Figure 17:
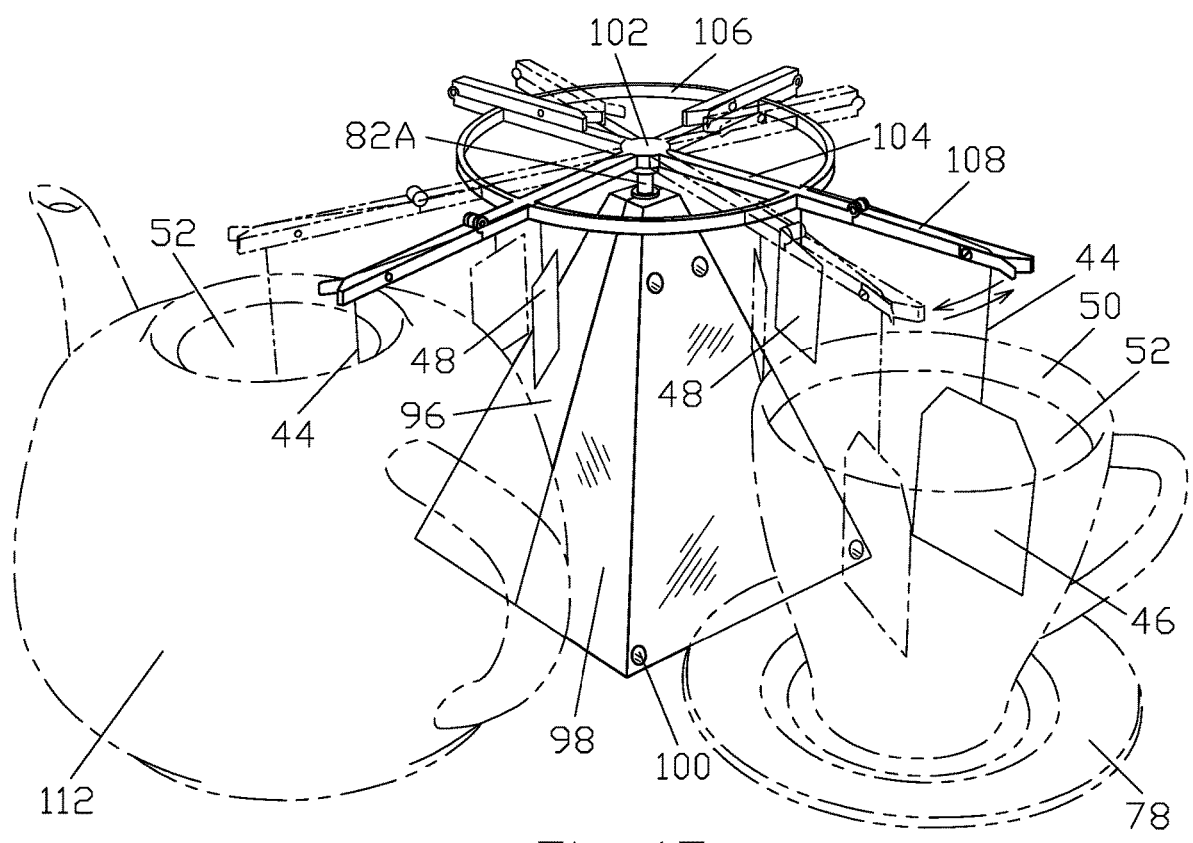
FIG. 17 is a perspective view of a pyramidal embodiment of the mover.

FIG. 17 shows a pyramidal embodiment of the infusion package mover designed for simultaneous infusion of four packages. The mover comprises a quadrilateral pyramidal housing comprising a first half 96 and a second half 98 joined by screws. The screws are installed into four holes 100. The housing has a battery compartment at its bottom, covered with a lid. The housing and the lid are made of a sufficiently rigid material, such as polystyrene. The mover also comprises a driving mechanism and an electric circuit located in the housing (described later). The mover further comprises a central hub 102, four radial beams 104, and a ring 106, altogether constituting a monolithic crownlike structure. Four pivotable arms 108 are attached to the ends of beams 104. The crown and arms 108 constitute a rocker of this embodiment. The driving mechanism and the crown are linked via a shaft 82A (also FIG. 20). The crown, arms 108 and shaft 82A are made of metal or other durable materials.

Figure 18:
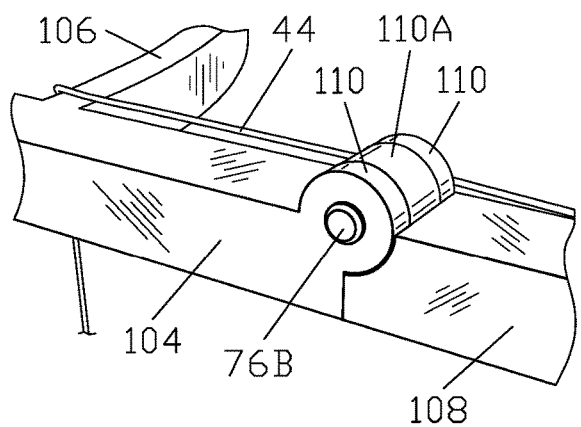
FIG. 18 is a close-up of the pyramidal embodiment's crown hinge.

FIG. 18 shows the hinge connection of arm 108 to the end of beam 104. A pin 76B is fixed motionless in the holes in two lugs 110 of beam 104. Pin 76B goes through the hole in a lug 110A of arm 108 with a predetermined gap. The gap allows arm 108 to pivot around the axis of pin 76B and maintain either folded or unfolded position. In FIG. 17 two arms 108 are folded and two unfolded.

Figure 19:
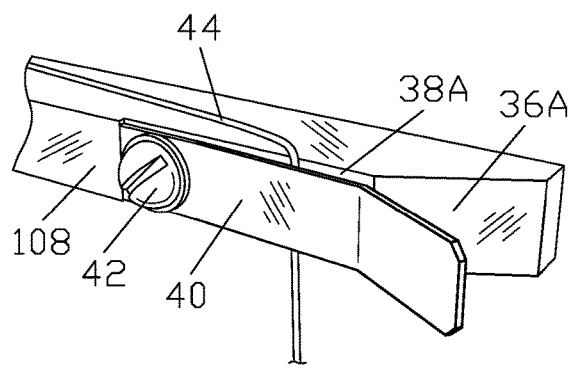
FIG. 19 is a close-up of the pyramidal embodiment's string holder.

FIG. 19 shows the end of arm 108, which has an inclined cutout 36A and a longitudinal cutout 38A. One end of spring 40 is secured in cutout 38A by screw 42. A slot formed by spring 40 with cutout 38A constitutes a package string holder. When nothing is inserted in the string holder, spring 40 is pressed against substantially the entire surface of cutout 38A. The free end of spring 40 is bent away from cutout 36A to facilitate insertion of string 44.

Similarly to the side button embodiment of FIGS. 1-5, first ends of two strings 44 (FIG. 17) are attached to infusion packages 46 and the second ends to tags 48. Cup 50, placed on saucer 78, and a teapot 112, both filled with liquid 52, stand near the side surfaces of the pyramidal housing. Strings 44 are set in the string holders of arms 108 so that bags 46 are immersed in liquid 52. Strings 44 hang on ring 106 (also FIG. 18) so that tags 48 are suspended away from cup 50 and teapot 112, thus tags 48 cannot get into liquid 52.

Figure 20:
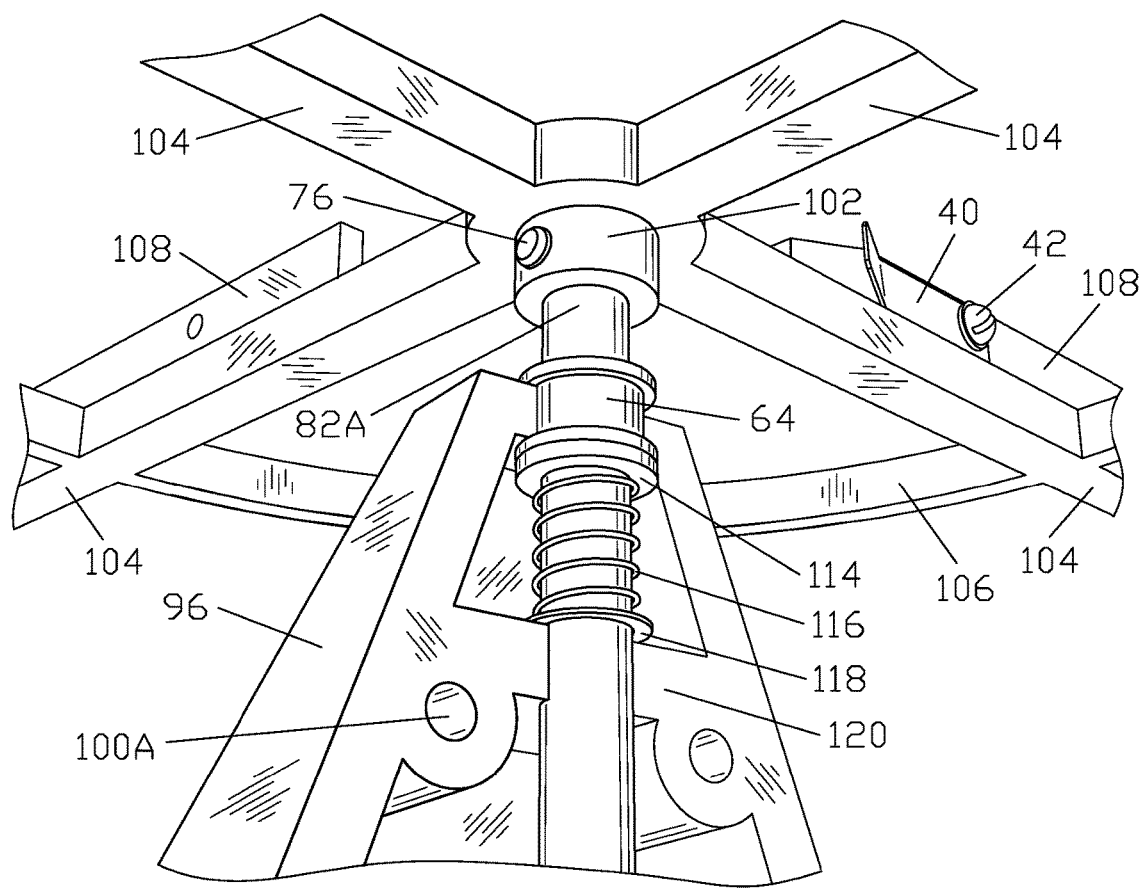
FIG. 20 is a perspective view of the upper part of the pyramidal embodiment.

FIG. 20 shows the upper part of the mover (half 98 is removed). The top end of shaft 82A is fixed in a blind hole of hub 102 with a pin 76. Shaft 82A is installed in two collar bushings 64 (also FIG. 21). The contacting surfaces of shaft 82A and bushings 64 are lubricated. Bushings 64 are located in adjacent semi-round openings in the top wall and in a projection 66C (FIG. 21) of half 96 and in the top wall and identical projection of half 98. A flange 114 (FIG. 20) of shaft 82A is pushed upward by the top end of a compression spring 116 winding around shaft 82A with a predetermined gap between them. The bottom end of spring 116 leans on a washer 118 placed on a horizontal tie plate 120 of half 96 and the matching tie plate of half 98. Spring 116 is strong enough to press flange 114 to the upper bushing 64 when the mover is unused or operating, but yields when hub 102 is pressed down by a finger. Two blind holes 100A accommodate the ends of the upper screws joining halves 96 and 98. Two similar holes (not shown) near the bottom of half 96 accommodate the ends of the lower screws.

Figure 21:
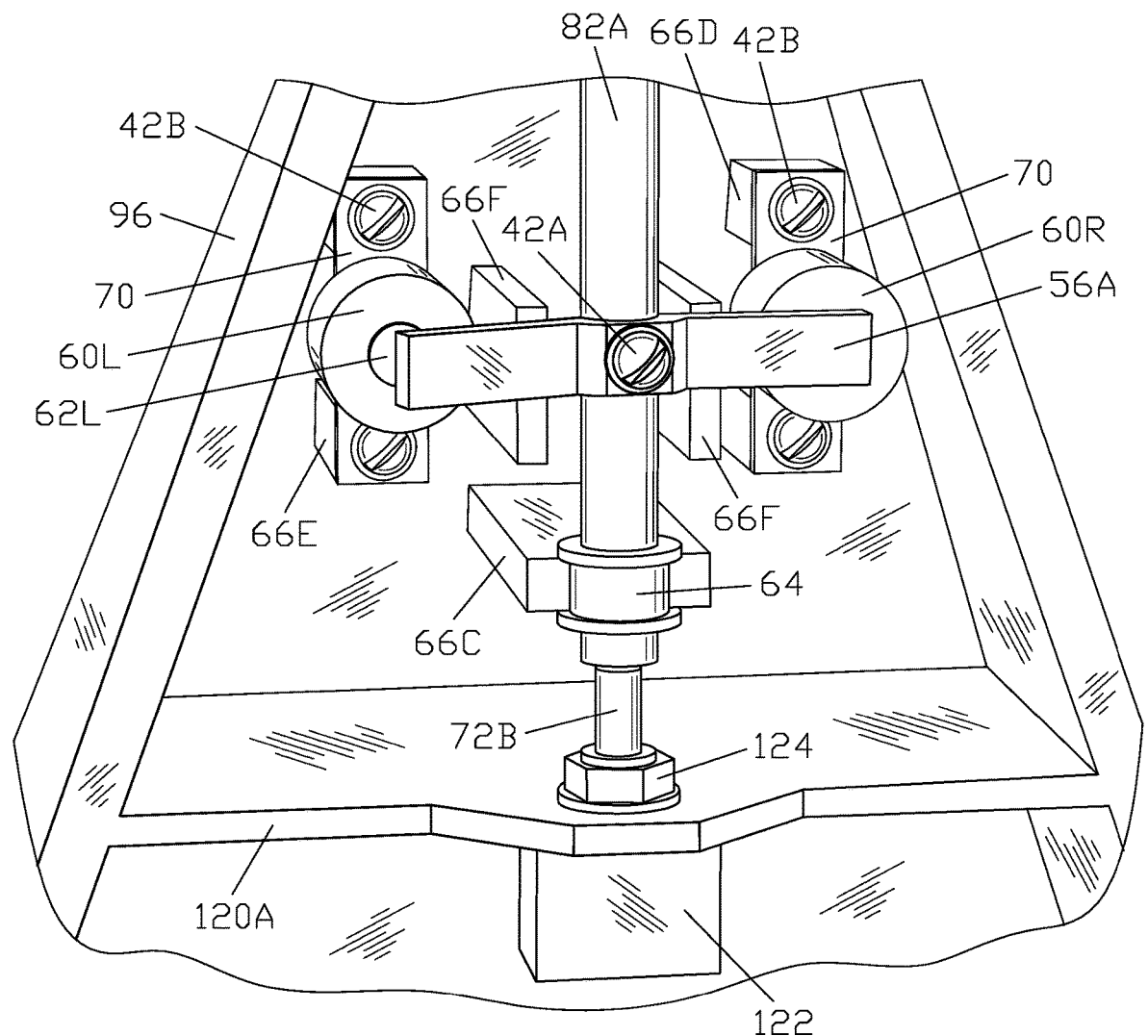
FIG. 21 is a perspective view of the pyramidal embodiment's housing interior.

FIG. 21 shows the housing interior where the driving mechanism is located. The mechanism comprises a W-shaped yoke 56A, a left electromagnet 60L with a core 62L and a right electromagnet 60R with a core 62R. Cores 62L and 62R are installed on two plates 70 with the help of screws (not shown). Plates 70 are fixed on two upper projections 66D and two lower projections 66E of half 96 by four screws 42B. Yoke 56A is made of magnetically soft steel having low magnetic remanence. Yoke 56A partially embraces shaft 82A and is fixed on it by screw 42A. The obtuse angle between the ends of yoke 56A defines the turning range of shaft 82A. Two projections 66F of half 96 keep yoke 56A away from cores 62L and 62R when yoke 56A is turned to either one of its two extreme positions. Thus, projections 66F ensure unimpeded vertical move of shaft 82A. Yoke 56A is shown in its first extreme position when it touches the right projection 66F. (This corresponds to the rocker's position shown in FIG. 17 in solid lines.) A push-button switch 122 with self-reset and a control button 72B is fixed in a hole in a horizontal tie plate 120A of half 96 by a nut 124. The battery compartment, elements of electric circuit and most of wires are located below plate 120A.

Figure 22:
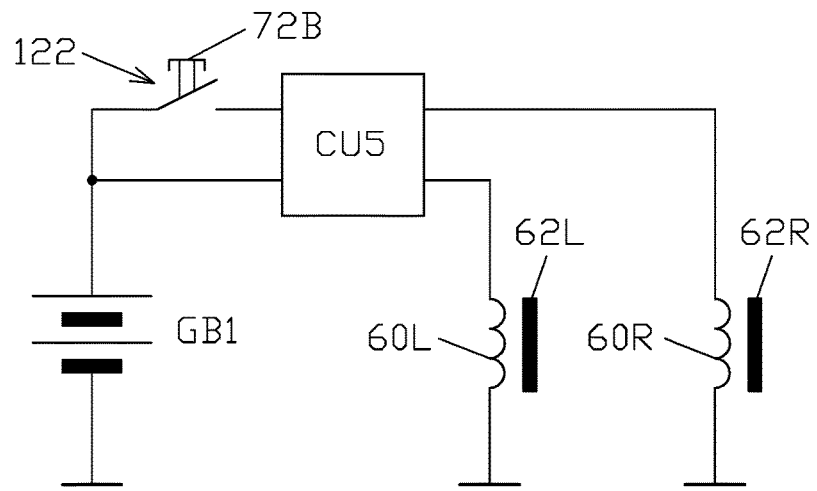
FIG. 22 is a circuit diagram of the pyramidal embodiment.

FIG. 22 shows the circuit diagram of the pyramidal embodiment similar to the one of the side button embodiment of FIG. 4. The electric circuit includes battery GB1, switch 122 with button 72B, a control unit CU5 and electromagnets 60L and 60R with cores 62L and 62R. Like unit CUL unit CU5 performs functions of a timer and an electronic switch. Initially unit CU5 stands by.

Operation

Pyramidal Embodiment—FIGS. 17-22

A brief finger push on hub 102 (FIG. 17) makes shaft 82A push down button 72B (FIG. 21). Button 72B closes the contacts of switch 122 (FIGS. 21, 22) and thereby initiates unit CU5. (When hub 102 is released, spring 116 (FIG. 20) returns shaft 82A to its initial position.) Unit CU5 starts a countdown and a periodic connection and disconnection of electromagnets 60L and 60R to and from battery GB1. The connections and disconnections are made in turn, i.e., when left electromagnet 60L is connected, right electromagnet 60R is disconnected, and vice versa. The duration of each connection and each disconnection is about 2 sec. Thus one cycle takes about 4 sec.

When electromagnet 60L (FIG. 21) is connected to battery GB1, its core 62L drags the left end of yoke 56A. Yoke 56A turns shaft 82A in bushings 64 until yoke 56A touches the left projection 66F. The touch defines the second extreme position of the mover's rocker shown in FIG. 17 in dash-dot-dot-dash lines. Consequently, strings 44 follow the string holders of the rocker and move packages 46 in liquid 52 to their second extreme positions also shown in FIG. 17 in dash-dot-dot-dash lines. By the same token, when electromagnet 60R is connected to battery GB1, its core 62R drags the right end of yoke 56A. Yoke 56A turns shaft 82A in bushings 64 until yoke 56A touches the right projection 66F. Consequently, the rocker returns to its initial extreme position, and strings 44 move packages 46 in liquid 52 to their initial extreme positions. Thus, the rocker turns cyclically in the directions shown by the arrows at the upper right in FIG. 17. As a result, bags 46 move continuously in liquid 52 and their contents infuses quickly and fully. The turnings of the rocker go until unit CU5 finishes its countdown (about 4 minutes), turns off electromagnets 60L and 60R and stands by.

The pyramidal embodiment can be used in public places like cafeteria, etc., where several people sitting at one table make their cups of tea simultaneously.

CONCLUSIONS, RAMIFICATIONS, AND SCOPE

Accordingly, the reader will see that the infusion package movers of the various embodiments have one or more of the following advantages:
  a. The use of the movers is convenient since there is no need to tug on or agitate a bag's string.
  b. The use of the movers is timesaving since a user can perform other tasks during infusion.
  c. The operation of the movers is fun and relaxing to watch.
  d. The movers make the infusion complete, hence the amount of a package contents, which nowadays is excessive (see below), can be reduced. Because of this, the production cost and retail price of the package should become lower.

While the above description contains many specificities, these should not be construed as limitations on the scope of any embodiment, but as exemplifications of the presently preferred embodiments thereof. Many other ramifications and variations are possible within the teachings of the various embodiments. For example, the embodiments can have an AC adapter as a power source or work from a mechanical power source, like a mechanical metronome that works from a wind-up spring. A reversible electric motor can be used to drive the rocking mechanism, either directly or via a transmission like a friction coupling, a worm-gear, a screw-gear, etc. The amplitude and frequency of the rocker's swinging can vary widely, so that rocking can even include vibration. If, instead of a string, a tea bag has an elongated side, that side can be arranged in a string holder. Furthermore, if a package string is made short enough and has a loop near its tag, the string can be suspended on a rocker without a string holder and horns. Similarly, a hole in the tag or elongated package side will work. The vertical leg of the C-shaped rocker can be made adjustable in its length, to better fit diverse cups and teapots. The pyramidal housing can have diverse number of sides and different shapes, such as round, cubic, oval, trapezoidal, triangular, etc. In addition, a package mover can be used to improve the process of spreading aroma in the air if a sachet or an odor stick is fixed on its rocker.

Moreover, introduction of the infusion package mover can influence the present tea packing industry and vice versa. For example, nowadays, tea bag manufacturers pack 2 g of a tea blend per bag and recommend infusing it for about 5 min. This time span is suitable for a motionless tea bag sitting on the bottom of a cup, but should be considered excessive for a continuously moving one. Furthermore, each tea drinker knows that a 2 g of tea per bag is sufficient to infuse two cups of tea if the bag is moved during infusion. Therefore, in the future, a 1 g tea per bag with 3 min of rocking can provide a good reference point for the prospective manufacturers of tea bags and infusion package movers.

Thus the scope should be determined by the appended claims and their legal equivalents, and not by the examples given.

The invention claimed is:

1. An infusion package mover, comprising:
  an automated driving mechanism for holding a package containing an infusible material so that said infusible material is immersed into a body of liquid,
  a power source for providing power to said automated driving mechanism,
  said automated driving mechanism arranged to transfer said package in said body of liquid in a plurality of substantially horizontal directions so that said entire package moves cyclically from one position in said liquid to a separate and horizontally spaced position in said liquid,
  whereby said movement of said package in said body of liquid will cause said infusible material to infuse more quickly and completely compared to an immobile state thereof.

2. The infusion package mover of claim 1 wherein said automated driving mechanism is arranged to cyclically transfer said package back-and-forth in said body of liquid from said one position to said separate and horizontally spaced position and back, said one position and said separate and horizontally spaced position are spaced by at least about half of a horizontal dimension of said package.

3. The infusion package mover of claim 1, further including a rocker linked to said automated driving mechanism so that said automated driving mechanism moves said rocker in a predetermined range, said package having suspension means for suspending said package from said rocker so that the contents of said package is immersed in said body of liquid.

4. The infusion package mover of claim 3, further including a shaft connected to said automated driving mechanism, and a coupler fixed on said shaft, said rocker and said coupler being detachably connected so that said shaft transmits movement from said automated driving mechanism to said rocker via said coupler.

5. The infusion package mover of claim 3 wherein said rocker includes a crown and a plurality of pivotable arms attached to said crown so that said arms maintain either a folded or an unfolded position, and further including a shaft connecting said automated driving mechanism to said rocker, said automated driving mechanism being arranged to rotate said rocker via said shaft.

6. The infusion package mover of claim 3, further including a removable rocker installed onto said rocker so that said automated driving mechanism moves said rocker and said removable rocker in a predetermined range, a package containing an infusible material and having suspension means suspended on said removable rocker so that said infusible material is immersed in said body of liquid.

7. The infusion package mover of claim 3, further including a grasping device for grasping and holding said suspension means of said package, said grasping device being attached to said rocker.

8. The infusion package mover of claim 3, further including means for keeping a tag attached to said suspension means away from said liquid during infusion, said means being attached to said rocker.

9. The infusion package mover of claim 1, further including a rocker linked to said automated driving mechanism so that said automated driving mechanism moves said rocker in a predetermined range, and further including a removable adjustable device for holding said package, said package being free of suspension means, said removable adjustable device being installed and adjusted on said rocker so that the contents of said package is immersed in said body of liquid.

10. The infusion package mover of claim 1, further including a housing for holding said automated driving mechanism.

11. The infusion package mover of claim 10 wherein said housing is arranged to hold a vessel containing said body of liquid.

12. The infusion package mover of claim 1 wherein said power source provides electric power and said automated driving mechanism utilizes said electric power.

13. The infusion package mover of claim 12 wherein said power source transforms heat into said electric power.

14. The infusion package mover of claim 12, further including an electric circuit for controlling said automated driving mechanism.

15. The infusion package mover of claim 14, further including an electric switch for activating and deactivating said electric circuit.

16. The infusion package mover of claim 15 wherein said switch is a thermo-switch whose contacts close and open when their temperature reaches predetermined high and low levels, respectively.

17. The infusion package mover of claim 1 wherein said power source provides mechanical power and said automated driving mechanism utilizes said mechanical power.

18. The infusion package mover of claim 17 wherein said power source is a winding mechanism.

19. A method for improving infusion of the contents of an infusion package, comprising:
   providing a package containing an infusible material,
   providing an extracting liquid,
   providing an automated apparatus for holding said package so that said infusible material is immersed in said liquid, said automated apparatus arranged to transfer said package in said liquid in a plurality of substantially horizontal directions so that said package moves cyclically from one position in said liquid to a separate and horizontally spaced position in said liquid,
   using said automated apparatus to move said package in said liquid,
   whereby said infusible material will infuse more quickly and completely compared to an immobile state thereof.

20. The method of claim 19 wherein said package has agitating means for agitating said package in said liquid and said automated apparatus has a device for holding said means for agitating.

* * * * *

UNITED STATES PATENT AND TRADEMARK OFFICE
CERTIFICATE OF CORRECTION

PATENT NO. : 10,582,785 B2
APPLICATION NO. : 15/242493
DATED : March 10, 2020
INVENTOR(S) : Marat Purliyev Page 1 of 1

It is certified that error appears in the above-identified patent and that said Letters Patent is hereby corrected as shown below:

Claim 1, Column 12, Line 22, delete "entire".

Signed and Sealed this
Seventh Day of April, 2020

Andrei Iancu
*Director of the United States Patent and Trademark Office*